US010686194B2

(12) United States Patent
Wang et al.

(10) Patent No.: US 10,686,194 B2
(45) Date of Patent: Jun. 16, 2020

(54) CATHODE MATERIAL FOR A SOLID OXIDE FUEL CELL AND METHOD FOR MAKING THE SAME

(71) Applicant: NATIONAL TAIPEI UNIVERSITY OF TECHNOLOGY, Taipei (TW)

(72) Inventors: Sea-Fue Wang, Taipei (TW); Yi-Xin Liu, Taipei (TW); Tung Lin, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 0 days.

(21) Appl. No.: 15/838,435

(22) Filed: Dec. 12, 2017

(65) Prior Publication Data

US 2019/0165381 A1   May 30, 2019

(30) Foreign Application Priority Data

Nov. 29, 2017 (TW) .............................. 106141532 A

(51) Int. Cl.
| | |
|---|---|
| H01M 4/90 | (2006.01) |
| C01F 17/00 | (2020.01) |
| H01M 8/1246 | (2016.01) |
| C04B 35/00 | (2006.01) |
| H01M 8/124 | (2016.01) |

(52) U.S. Cl.
CPC ............ *H01M 4/9033* (2013.01); *C04B 35/00* (2013.01); *H01M 8/1246* (2013.01); *H01M 2008/1293* (2013.01)

(58) Field of Classification Search
CPC ............. H01M 4/9033; H01M 8/1246; H01M 2008/1293; H01M 4/9016; H01M 8/0217; C01F 17/00; C01F 17/224; C01F 14/229; C01F 17/32
USPC ...................................................... 252/500
See application file for complete search history.

(56) References Cited

U.S. PATENT DOCUMENTS

2016/0122886 A1* 5/2016 Wang .................. B01D 53/326
    205/551

OTHER PUBLICATIONS

Kwang et al. "Studies of Nonstoichiometry and Magnetic Properties of the Perovskite Gd1—xSrxCoO3—y System". Journal of Solid State Chemistry. vol. 105, Issue 2, Aug. 1993, pp. 550-560. (Year: 1993).*
Yanan et al. "Preparation and Characterization of Gd1—xSrxCoO3—y". Key Engineering Materials vols. 368-372. Online: Feb. 11, 2008. pp. 268-269. (Year: 2008).*
Synthesis, structure and thermoelectric properties of La1—xNaxCoO3 perovskite oxides, Behera et al., Bull. Mater. Sci., vol. 40, No. 7, Dec. 2017, pp. 1291-1299.*
Catalytic removal of diesel soot particulates over K and Mg substituted La1—xKxCo1—yMgyO3 perovskite oxides, Fang et al., Catalysis Communications 49 (2014) 15-19.*
Perovskites as Substitutes of Noble Metals for Heterogeneous Catalysis: Dream or Reality, Royer et al., Chem. Rev. 2014, 114, 10292-10368.*
Nunzio Russo, et al., "Lanthanum cobaltite catalysts for diesel soot combustion"; Applied Catalysis B: Environmental 83, 2008, 85-98.
N. B. Ivanova, et al., "Effect of Strontium and Barium Doping on the Magnetic State and Electrical Conductivity of GdCoO3", ISSN 1063-7834, Physics of the Solid State, 2007, vol. 49, No. 8, pp. 1498-1506.
Y. Takeda, et al., "Gd1—xSrxCoO3 for the electrode of solid oxide fuel cells", Solid State Ionics 86-88 (1996), pp. 1187-1190.
Search Report appended to an Office Action, which was issued to Taiwanese counterpart application No. 106141532 by the TIPO dated Jul. 30, 2018, with an English translation thereof.

* cited by examiner

*Primary Examiner* — Haidung D Nguyen
(74) *Attorney, Agent, or Firm* — Barnes & Thornburg LLP

(57) ABSTRACT

A cathode material for a solid oxide fuel cell comprises a perovskite type complex oxide which is represented by Formula 1: $Gd_{1-x}M_xCoO_{3-\delta}$. In Formula 1, M represents an alkali metal, x is larger than 0 and not more than 0.75, and δ ranges from 0 to 2.

11 Claims, No Drawings

CATHODE MATERIAL FOR A SOLID OXIDE FUEL CELL AND METHOD FOR MAKING THE SAME

CROSS-REFERENCE TO RELATED APPLICATION

This application claims priority of Taiwanese Application No. 106141532, filed on Nov. 29, 2017.

FIELD

The disclosure relates to a cathode material for a solid oxide fuel cell, and more particularly to a cathode material for a solid oxide fuel cell which comprises an alkali metal-doped perovskite type complex oxide.

BACKGROUND

Ceramic oxide material having a perovskite structure with a general formula of $ABO_3$, in which A and B are two cations of very different sizes, is commonly used in solid oxide fuel cells (SOFCs) due to good thermal stability, mechanical strength, and conductivity thereof. Specifically, $GdCoO_3$-based ceramic oxide material has superior thermal stability and is a mixed ionic-electronic conductor, and thus is promisingly used as a cathode material for a solid oxide fuel cell.

Solid oxide fuel cells are conventionally operated at a relatively high temperature, for example, from 800° C. to 1000° C., due to the relatively high reaction activation energy of solid oxide materials used therein. It is desirable in the art to provide a ceramic oxide material of the perovskite structure which still has satisfactory electrical conductivity at a relatively low temperature, for example, from 500° C. to 800° C.

An article entitled "$Gd_{1-x}Sr_xCoO_3$ for the electrode of solid oxide fuel cells" by Y. Takeda et al. in *Solid State Ionic* 86-88 (1996) 1187-1190 discloses a study of a system of $Gd_{1-x}Sr_xCoO_3$ for electrical conductivity, cathodic polarization and reactivity.

Another article entitled "Effect of strontium and barium doping on the magnetic state and electrical conductivity of $GdCoO_3$" by N. B. Ivanova et al. in *Physics of the Solid State*, vol. 49, 2007, pp. 1498-1506 discloses a coordinated investigation of magnetic and electrical properties of polycrystalline cobalt oxide compounds $GdCoO_3$, $Gd_{0.9}Ba_{0.1}CoO_3$, and $Gd_{0.9}Sr_{0.1}CoO_3$.

SUMMARY

An object of the disclosure is to provide a cathode material which has satisfactory electrical conductivity at a relatively low temperature such that a solid oxide fuel cell including the cathode material may be operated at the relatively low temperature.

According to an aspect of the disclosure, there is provided a cathode material for a solid oxide fuel cell. The cathode material comprises a perovskite type complex oxide represented by Formula 1:

$$Gd_{1-x}M_xCoO_{3-\delta} \quad \text{Formula 1}$$

wherein
M represents an alkali metal;
x is larger than 0 and not more than 0.75; and
δ ranges from 0 to 2.

According to another aspect of the disclosure, there is provided a method for making a cathode material for a solid oxide fuel cell, which comprises steps of:

a) processing a first mixture which includes gadolinium oxide, cobalt oxide, and an alkali metal precursor containing an alkali metal to obtain a perovskite type complex oxide represented by Formula 1:

$$Gd_{1-x}M_xCoO_{3-\delta} \quad \text{Formula 1}$$

wherein
M represents an alkali metal,
x is larger than 0 and not more than 0.75, and
δ ranges from 0 to 2;

b) grinding the perovskite type complex oxide into a powder;

c) mixing the powder and a binder to obtain a second mixture;

d) processing the second mixture to obtain a green compact; and e) sintering the green compact to obtain the cathode material.

DETAILED DESCRIPTION

A cathode material for a solid oxide fuel cell according to the disclosure comprises a perovskite type complex oxide represented by Formula 1:

$$Gd_{1-x}M_xCoO_{3-\delta} \quad \text{Formula 1}$$

wherein
M represents an alkali metal;
x is larger than 0 and not more than 0.75; and
δ ranges from 0 to 2.

In some embodiments, M is sodium and x ranges from 0.005 to 0.030.

In some embodiments, M is potassium and x ranges from 0.005 to 0.025.

A method for making a cathode material for a solid oxide fuel cell according to the disclosure comprises steps of:

a) processing a first mixture which includes gadolinium oxide ($Gd_2O_3$), cobalt oxide ($Co_3O_4$), and an alkali metal precursor containing an alkali metal to obtain a perovskite type complex oxide represented by Formula 1:

$$Gd_{1-x}M_xCoO_{3-\delta} \quad \text{Formula 1}$$

wherein
M represents an alkali metal,
x is larger than 0 and not more than 0.75, and
δ ranges from 0 to 2;

b) grinding the perovskite type complex oxide into a powder;

c) mixing the powder and a binder to obtain a second mixture;

d) processing the second mixture to obtain a green compact; and e) sintering the green compact to obtain the cathode material.

In some embodiments, step a) is performed by calcination.

In some embodiments, the alkali metal precursor is selected from the group consisting of sodium carbonate, sodium nitrate, sodium hydroxide, sodium ethoxide, sodium hydrocarbonate, sodium peroxide, potassium carbonate, potassium nitrate, potassium hydroxide, potassium nitrite, potassium chloride, and combinations thereof.

In some embodiments, M is sodium, and a molar ratio of sodium contained in the alkali metal precursor to gadolinium (Gd) contained in gadolinium oxide ($Gd_2O_3$) is in a range from $5\times10^{-3}$ to $31\times10^{-3}$.

In some embodiments, M is potassium, and a molar ratio of potassium contained in the alkali metal precursor to gadolinium (Gd) contained in gadolinium oxide ($Gd_2O_3$) is in a range from $5\times10^{-3}$ to $26\times10^{-3}$.

In some embodiments, step d) is performed by isostatic pressing.

In some embodiments, step e) is performed at a sintering temperature ranging from 1150° C. to 1350° C.

In some embodiments, the binder used in step c) is selected from the group consisting of polyvinyl alcohol, paraffin wax, polyethylene, polypropylene, polystyrene, poly(methyl methacrylate), ethylene-vinyl acetate copolymer, ethylene-ethyl acrylate copolymer, and combinations thereof.

Examples of the disclosure will be described hereinafter. It is to be understood that these examples are exemplary and explanatory and should not be construed as a limitation to the disclosure.

EXAMPLE 1

Preparation of a Cathode Material (E1) Containing $Gd_{0.990}Na_{0.010}CoO_{3-d}$ Gadolinium oxide ($Gd_2O_3$) powder (purity: above 99.5%), sodium carbonate ($Na_2CO_3$) powder (purity: above 99.5%), and cobalt oxide ($Co_3O_4$) powder (purity: above 99.5%) were mixed in a molar ratio of $Gd_2O_3:Na_2CO_3:Co_3O_4$ of 0.990:0.005:0.333 to obtain a mixture. The mixture was loaded into a polyethylene (PE) milling bottle containing zirconia balls (3 mm) in a weight ratio of the mixture to the zirconia balls of 1:10, followed by addition of ethanol and ball milling for 24 hours to obtain a slurry. The slurry was dried in an oven at a temperature of 90° C. to obtain a powdery body. The powdery body was pulverized in a mortar and was then placed in an alumina crucible, followed by heating in a furnace at a rate of 5° C./min to a temperature of 950° C. and maintaining the temperature for 4 hours for calcination to obtain a first powdery material of $Gd_{0.990}Na_{0.010}CoO_{3-d}$.

The first powdery material of $Gd_{0.990}Na_{0.010}CoO_{3-d}$ was loaded into the PE milling bottle containing the zirconia balls (3 mm) in a weight ratio of the first powdery material to the zirconia balls of 1:10, followed by addition of ethanol and ball milling for 24 hours so as to reduce an aggregation phenomenon caused by the calcination process. A slurry thus obtained was dried in the oven at a temperature of 90° C. to obtain a second powdery material.

The second powdery material was mixed with an aqueous polyvinyl alcohol solution (15 wt %, as a binder) in a weight ratio of the second powdery material to the aqueous polyvinyl alcohol solution of 95:5, followed by pelletization and sieving through an 80 mesh sieve to obtain a sieved powdery material. The sieved powdery material (0.3 g) was placed into a disc mould, followed by cold isostatic pressing using a single-screw cold press at a pressure of 150 MPa for 30 seconds to obtain a green compact having a diameter of about 9 mm and a thickness of about 2 mm.

The green compact was placed in the alumina crucible and was heated in the furnace at a rate of 5° C./min to a temperature of 550° C., and the temperature was maintained at 550° C. for 4 hours to remove polyvinyl alcohol and other impurities, followed by heating at a rate of 5° C./min to a temperature of 1250° C. and maintaining the temperature for 4 hours for sintering to obtain a cathode material (E1).

EXAMPLE 2

Preparation of a Cathode Material (E2) Containing $Gd_{0.980}Na_{0.020}CoO_{3-d}$ The procedure of Example 1 was repeated except that the molar ratio of $Gd_2O_3:Na_2CO_3:Co_3O_4$ was 0.980:0.010:0.333.

EXAMPLE 3

Preparation of a Cathode Material (E3) Containing $Gd_{0.975}Na_{0.025}CoO_{3-d}$ The procedure of Example 1 was repeated except that the molar ratio of $Gd_2O_3:Na_2CO_3:Co_3O_4$ was 0.975:0.0125:0.333.

EXAMPLE 4

Preparation of a Cathode Material (E4) Containing $Gd_{0.970}Na_{0.030}CoO_{3-d}$ The procedure of Example 1 was repeated except that the molar ratio of $Gd_2O_3:Na_2CO_3:Co_3O_4$ was 0.970:0.015:0.333.

EXAMPLE 5

Preparation of a Cathode Material (E5) Containing $Gd_{0.950}Na_{0.050}CoO_{3-d}$ The procedure of Example 1 was repeated except that the molar ratio of $Gd_2O_3:Na_2CO_3:Co_3O_4$ was 0.950:0.025:0.333.

EXAMPLES 6

Preparation of a Cathode Material (E6) containing $Gd_{0.990}K_{0.010}CoO_{3-d}$ The procedure of Example 1 was repeated except that Gadolinium oxide ($Gd_2O_3$) powder (purity: above 99.5%), potassium carbonate ($K_2CO_3$) powder (purity: above 99.5%), and cobalt oxide ($Co_3O_4$) powder (purity: above 99.5%) were mixed in a molar ratio of $Gd_2O_3:K_2CO_3:Co_3O_4$ of 0.990:0.005:0.333 to obtain a mixture.

EXAMPLE 7

Preparation of a Cathode Material (E7) Containing $Gd_{0.980}K_{0.020}CoO_{3-d}$ The procedure of Example 1 was repeated except that Gadolinium oxide ($Gd_2O_3$) powder (purity: above 99.5%), potassium carbonate ($K_2CO_3$) powder (purity: above 99.5%), and cobalt oxide ($Co_3O_4$) powder (purity: above 99.5%) were mixed in a molar ratio of $Gd_2O_3:K_2CO_3:Co_3O_4$ of 0.980:0.010:0.333 to obtain a mixture.

EXAMPLE 8

Preparation of a Cathode Material (E8) Containing $Gd_{0.975}K_{0.025}CoO_{3-d}$ The procedure of Example 1 was repeated except that Gadolinium oxide ($Gd_2O_3$) powder (purity: above 99.5%), potassium carbonate ($K_2CO_3$) powder (purity: above 99.5%), and cobalt oxide ($Co_3O_4$) powder (purity: above 99.5%) were mixed in a molar ratio of $Gd_2O_3:K_2CO_3:Co_3O_4$ of 0.975:0.0125:0.333 to obtain a mixture.

EXAMPLE 9

Preparation of a Cathode Material (E9) Containing $Gd_{0.970}K_{0.030}CoO_{3-d}$ The procedure of Example 1 was repeated except that gadolinium oxide ($Gd_2O_3$) powder (purity: above 99.5%), potassium carbonate ($K_2CO_3$) powder (purity: above 99.5%), and cobalt oxide ($Co_3O_4$) powder (purity: above 99.5%) were mixed in a molar ratio of $Gd_2O_3:K_2CO_3:Co_3O_4$ of 0.970:0.015:0.333 to obtain a mixture.

EXAMPLE 10

Preparation of a Cathode Material (E10) Containing $Gd_{0.950}K_{0.050}CoO_{3-d}$ The procedure of Example 1 was repeated except that Gadolinium oxide ($Gd_2O_3$) powder (purity: above 99.5%), potassium carbonate ($K_2CO_3$) powder (purity: above 99.5%), and cobalt oxide ($Co_3O_4$) powder (purity: above 99.5%) were mixed in a molar ratio of $Gd_2O_3:K_2CO_3:Co_3O_4$ of 0.950:0.025:0.333 to obtain a mixture.

EXAMPLE 11

Preparation of a Cathode Material (E11) containing $Gd_{0.925}K_{0.075}CoO_{3-d}$ The procedure of Example 1 was repeated except that Gadolinium oxide ($Gd_2O_3$) powder (purity: above 99.5%), potassium carbonate ($K_2CO_3$) powder (purity: above 99.5%), and cobalt oxide ($Co_3O_4$) powder (purity: above 99.5%) were mixed in a molar ratio of $Gd_2O_3:K_2CO_3:Co_3O_4$ of 0.925:0.0375:0.333 to obtain a mixture.

COMPARATIVE EXAMPLE 1

Preparation of a Cathode Material (CE1) containing $GdCoO_{3-d}$

The procedure of Example 1 was repeated except that the molar ratio of $Gd_2O_3:Na_2CO_3:Co_3O_4$ was 1:0:0.333 (i.e., $Na_2CO_3$ powder was not used).

Measurement of Electrical Conductivity (σ):

The sieved powdery material in each of Examples 1-11 and Comparative Example 1 was pressed in a mould at a pressure of 300 MPa for 60 seconds and was then sintered, cut, and polished to make a test sample having a size of 4 mm×2 mm×30 mm. The test sample was subjected to an electrical conductivity measurement. In the measurement, the test sample was connected to an electrochemical analyzer via silver wires and was applied with a constant current. Voltage values were measured at 500° C., 600° C., 700° C., and 800° C., respectively, so as to calculate electrical conductivity therefrom. The results are shown in Table 1.

TABLE 1

| Cathode material | Electrical conductivity (S/cm) | | | |
| --- | --- | --- | --- | --- |
| | 500° C. | 600° C. | 700° C. | 800° C. |
| E1 | 114.2 | 330.6 | 496.6 | 603.0 |
| E2 | 143.3 | 366.1 | 521.6 | 607.6 |
| E3 | 143.8 | 365.0 | 506.0 | 623.7 |
| E4 | 136.7 | 326.9 | 459.9 | 577.2 |
| E5 | 58.7 | 161.5 | 305.1 | 413.4 |

TABLE 1-continued

| Cathode material | Electrical conductivity (S/cm) | | | |
| --- | --- | --- | --- | --- |
| | 500° C. | 600° C. | 700° C. | 800° C. |
| E6 | 154.1 | 379.0 | 525.3 | 677.6 |
| E7 | 136.2 | 373.7 | 564.1 | 717.6 |
| E8 | 156.4 | 397.2 | 562.4 | 711.4 |
| E9 | 140.0 | 327.3 | 464.8 | 585.9 |
| E10 | 105.9 | 280.8 | 449.3 | 604.4 |
| E11 | 114.3 | 289.1 | 459.2 | 618.1 |
| CE | 57.9 | 223.5 | 427.7 | 627.9 |

As shown in Table 1, the electrical conductivity values of the cathode materials obtained in Examples 1-11 are larger than that of the cathode material obtained in Comparative Example 1 at 500° C. The electrical conductivity values of the cathode materials obtained in Examples 1-4 and 6-11 are larger than those of the cathode material obtained in Comparative Example 1 at 500° C., 600° C., and 700° C. The electrical conductivity values of the cathode materials obtained in Examples 6-8 are larger than those of the cathode material obtained in Comparative Example 1 at 500° C., 600° C., 700° C., and 800° C.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A cathode material for a solid oxide fuel cell, comprising a perovskite type complex oxide represented by Formula 1:

$$Gd_{1-x}M_xCoO_{3-\delta} \quad \text{Formula 1}$$

wherein
M represents an alkali metal;
x is larger than 0 and not more than 0.030; and
δ ranges from 0 to 2.

2. The cathode material according to claim 1, wherein M is sodium and x ranges from 0.005 to 0.030.

3. The cathode material according to claim 1, wherein M is potassium and x ranges from 0.005 to 0.025.

4. A method for making a cathode material for a solid oxide fuel cell, comprising steps of:
a) processing a first mixture which includes gadolinium oxide, cobalt oxide, and an alkali metal precursor containing an alkali metal to obtain a perovskite type complex oxide represented by Formula 1:

$$Gd_{1-x}M_xCoO_{3-\delta} \quad \text{Formula 1}$$

wherein

M represents an alkali metal, x is larger than 0 and not more than 0.030, and

δ ranges from 0 to 2;

b) grinding the perovskite type complex oxide into a powder;

c) mixing the powder and a binder to obtain a second mixture;

d) processing the second mixture to obtain a green compact; and e) sintering the green compact to obtain the cathode material.

5. The method according to claim 4, wherein step a) is performed by calcination.

6. The method according to claim 4, wherein the alkali metal precursor is selected from the group consisting of sodium carbonate, sodium nitrate, sodium hydroxide, sodium ethoxide, sodium hydrocarbonate, sodium peroxide, potassium carbonate, potassium nitrate, potassium hydroxide, potassium nitrite, potassium chloride, and combinations thereof.

7. The method according to claim 4, wherein M is sodium, and a molar ratio of sodium contained in the alkali metal precursor to gadolinium contained in gadolinium oxide is in a range from $5 \times 10^{-3}$ to $31 \times 10^{-3}$.

8. The method according to claim 4, wherein M is potassium, and a molar ratio of potassium contained in the alkali metal precursor to gadolinium contained in gadolinium oxide is in a range from $5 \times 10^{-3}$ to $26 \times 10^{-3}$.

9. The method according to claim 4, wherein the binder is selected from the group consisting of polyvinyl alcohol, paraffin wax, polyethylene, polypropylene, polystyrene, poly(methyl methacrylate), ethylene-vinyl acetate copolymer, ethylene-ethyl acrylate copolymer, and combinations thereof.

10. The method according to claim 4, wherein step d) is performed by isostatic pressing.

11. The method according to claim 4, wherein step e) is performed at a sintering temperature ranging from 1150° C. to 1350° C.

* * * * *